UNITED STATES PATENT OFFICE.

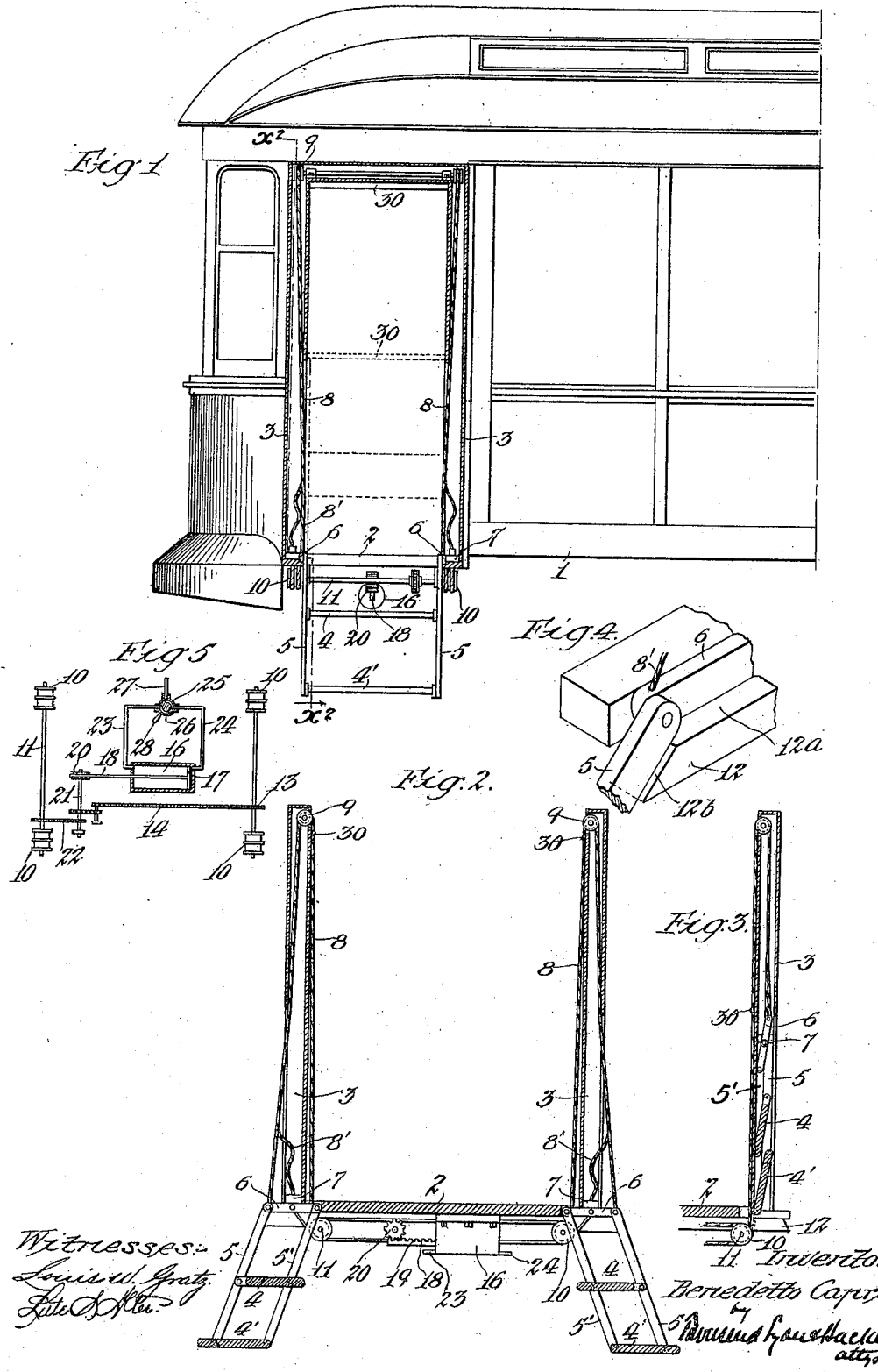
B. CAPRA.
COMBINATION CAR STEP AND GATE.
APPLICATION FILED AUG. 16, 1909.
975,017.
Patented Nov. 8, 1910.

BENEDETTO CAPRA, OF LOS ANGELES, CALIFORNIA.

COMBINATION CAR-STEP AND GATE.

975,017.

Specification of Letters Patent.  Patented Nov. 8, 1910.

Application filed August 16, 1909. Serial No. 513,201.

*To all whom it may concern:*

Be it known that I, BENEDETTO CAPRA, a subject of the King of Italy, residing at Los Angeles, in the county of Los Angeles and State of California, have invented a new and useful Combination Car-Step and Gate, of which the following is a specification.

This invention relates to car steps which can be folded to form gates for the platform, and the main object of the invention is to provide improved operating means for the steps, whereby the steps may be raised and lowered under control of a motorman or other person.

Another object of the invention is to provide a construction whereby the steps can be raised or lowered by a direct bodily movement in nearly a vertical path, without swinging the steps with a circular movement around a pivot, thereby accomplishing the movement of the steps into either a raised or lowered position in much less time. Also by thus keeping the steps close to and protected by the car, during such movement, the danger of striking objects along the track is avoided.

In the accompanying drawings, illustrating the invention:

Figure 1 is a side elevation of a car platform with the steps in lowered position. Fig. 2 is a transverse section on line $x^2$—$x^2$ in Fig. 1. Fig. 3 is a view of one side of the platform showing the steps in raised position. Fig. 4 is a perspective view of the end of a beam which supports the steps when lowered. Fig. 5 is a diagrammatic plan of the operating mechanism.

1 designates the car body or frame, 2 a platform thereon, and 3 designates grooved posts at each side of the platform. Each set of steps comprises an upper tread 4 and a lower tread 4', both of which are pivotally mounted on hanger bars 5 and 5', the upper ends of the latter being pivoted to opposite ends of cross bars 6 at each side of the steps which serve as the supporting members. The treads 4 and 4' are parallel to the cross bars 6, and when the steps are lowered all these members 6, 4 and 4' extend horizontally. Each cross bar 6 is a floating member, being pivoted at its middle to a block 7 slidable in a grooved post 3 and suspended by flexible means such as a cable 8 which passes upwardly within the posts 3, over pulleys 9, and down to a drum 10 on a shaft 11, which is journaled on the car body 1. Projecting from under the platform 2 at each side of the door-way is a beam 12 formed with a rabbet $12^a$ at the outer end of which is an angular seat $12^b$ as shown in Fig. 4. When the steps are in lowered position the cross arms 6 rest flatly upon the rabbets $12^a$, and the bars 5, 5' at this time are held firmly in an inclined position by the inclined seats $12^b$. A branch connection 8' extends from the cable 8 to the outer end of the cross bar 6.

It is preferred to operate the steps on both sides of the car simultaneously, and gears 13 and sprocket chain connections 14 are provided between the operating shafts 11 for the two steps, for this purpose.

The steps are operated by means controlled by the motorman, conductor, engineer or other person in charge. For this purpose pneumatic operating means is preferred, which comprises a cylinder 16, in which works a piston 17, provided with a rod 18 formed with a rack 19 engaging a gear wheel 20 on a shaft 21, which is connected by sprocket chain gearing 22 to one of the shafts 11. Pneumatic connections 23, 24 communicate with the respective ends of cylinder 16, and lead to two openings of a fourway valve 25 provided with an exhaust opening 26 and with a pressure supply pipe 27 leading to the usual compresed air tank for the brakes. Valve 25 is operated by controller or handle 28 located in convenient position for control by the motorman. A bar 30 connected to the cables 8 normally stands at the top of the doorway between the platform posts when the steps are down, as shown in full lines in Fig. 1, and when the steps are raised to the position shown in dotted lines in Fig. 1 the bar 30 descends to a position somewhat above the folded steps as shown in dotted lines, so that in this position it acts as a guard rail for the platform.

The operation is as follows:—When the steps are in normal position, as shown in full lines in Fig. 2, they project out at an angle so as to be in convenient position for use, being supported in this position by inclined seats $12^b$ and rabbeted portions $12^a$ of beams 12, the cable being then at its greatest extension, with the piston 17 at one end of its stroke. When the steps are to be raised, the controller 28 is operated to allow compressed air to flow through valve 25 and pipe 24 to cylinder 16, causing the piston 17 to operate rack 19, gear 20 and shafts 21 and 11, and the cable 8 on drum 10, thereby drawing the outer ends of the bars 6 upwardly. This raises the supporting bar 5 somewhat and lowers the supporting bar 5', thereby folding the treads 4, 4' into a substantially vertical position. Continued movement of the cable 8 results in drawing up the steps bodily until they assume the position shown in Fig. 5. It will be noted that the movement of the steps, from operative or extended position into folded or guard position, is accomplished by substantially an upward bodily movement of the entire steps in nearly a vertical path. Thus the movement is accomplished very quickly and at no time does any part of the steps project any farther from the car than when in its regular projected position. In fact, the projected position of the steps is when they are farthest from the car, and during the folding movement they are gradually drawn closer toward the car with an upward movement. In lowering the steps the controller is operated reversely to admit air to the opposite end of the cylinder and exhaust it from the other end to reverse the operation above described, during which cables 3', which are wound on lower drums 10, pull downwardly on blocks 7 and thus lower the steps.

What I claim is:—

1. The combination with vertical guides, car steps mounted to be movable bodily along said vertical guides to raised or lowered position, of pneumatic operating means connected to raise and to lower said steps along said guides by reverse operation of the same operating means, and a controller for reversing the operation of the operating means.

2. The combination with car steps mounted to be movable to raised or lowered position, a cylinder provided with a piston, connections between the piston and the steps to raise or lower the steps in the reverse movements of the piston, a pneumatic pressure supply, and a controller for establishing connection from said supply to one or the other end of said cylinder.

3. The combination with a car body, of cross bars movable vertically on said car body, hanger bars pivoted on said cross bars, steps extending between said hanger bars and pivoted thereto, lifting cables connected to said cross bars, and means for operating the cables for raising and lowering the steps.

4. The combination with a car body, of cross bars movable vertically on said body, hanger bars pivoted on said cross bars, steps extending between said hanger bars and pivoted thereto, stop means engaging with the inner end of the cross bars, a lifting cable connected to said cross bar, and means operating the cables for raising and lowering the steps, the cable being provided with a connection to the outer end of the cross bar and with a connection to the middle of the cross bar, the middle connection being slack when the steps are lowered.

5. The combination with a platform of a car, steps therefor comprising a plurality of treads, supports for the treads, means comprising a flexible connection extending upwardly from each support to a point above the platform, thence extending downwardly to a point at the platform for moving the said supports substantially vertically with respect to the platform to lift the steps bodily from a position below the platform to a position above the platform, means at the platform for operating the flexible connections and means for causing the steps to project laterally from the car when in their lowered position.

6. In combination with the platform of a car, a set of steps for each platform, means for causing each set of steps to project laterally from the car when in their lower position, and means connected to the upper end of each set of steps for raising each set of steps substantially vertically with respect to the platform to lift the steps bodily from a position below the platform to a position above the platform.

In testimony whereof, I have hereunto set my hand at Los Angeles California this 10th day of August 1909.

BENEDETTO CAPRA.

In presence of—
ARTHUR P. KNIGHT,
FRANK L. A. GRAHAM.